United States Patent
Shuster

(10) Patent No.: US 9,721,144 B2
(45) Date of Patent: *Aug. 1, 2017

(54) GRAPHIC DATA ALTERATION TO ENHANCE ONLINE PRIVACY

(71) Applicant: Gary S. Shuster, Fresno, CA (US)

(72) Inventor: Gary S. Shuster, Fresno, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 14/853,782

(22) Filed: Sep. 14, 2015

(65) Prior Publication Data

US 2016/0004903 A1 Jan. 7, 2016

Related U.S. Application Data

(63) Continuation of application No. 14/294,047, filed on Jun. 2, 2014, now Pat. No. 9,135,493, which is a
(Continued)

(51) Int. Cl.
*G06K 9/00* (2006.01)
*H04L 29/06* (2006.01)
(Continued)

(52) U.S. Cl.
CPC ......... *G06K 9/00221* (2013.01); *G06K 9/00* (2013.01); *H04L 63/0407* (2013.01); *H04W 12/02* (2013.01); *G06F 21/32* (2013.01); *G06K 2009/00953* (2013.01); *G07C 2209/12* (2013.01)

(58) Field of Classification Search
None
See application file for complete search history.

(56) References Cited

U.S. PATENT DOCUMENTS 7,624,277 B1 * 11/2009 Simard ............... G06F 21/31
704/270
8,392,986 B1 * 3/2013 Gossweiler, III ....... G06F 21/46
713/172
(Continued)

OTHER PUBLICATIONS

Kantarcioglu et al ("Privacy-Preserving Distributed Mining of Association Rules on Horizontally Partitioned Data",IEEE Transactions on Knowledge and Data Engineering, vol. 16, No. 9, Sep. 2004).*

(Continued)

*Primary Examiner* — Shervin Nakhjavan
(74) *Attorney, Agent, or Firm* — Sherrie Flynn; Coleman & Horowitt, LLP

(57) ABSTRACT

A computer alters at least one recognizable metric or text in a digitally encoded photographic image by operating an alteration algorithm in response to user input data while preserving an overall aesthetic quality of the image and obscuring an identity of at least one individual or geographic location appearing in the image. An altered digitally-encoded photographic image prepared by the altering of the at least one recognizable metric or text in the image is stored in a computer memory. User feedback and/or automatic analysis may be performed to define parameter values of the alteration algorithm such that the alteration process achieves preservation of aesthetic qualities while obscuring an identity of interest.

20 Claims, 3 Drawing Sheets

Related U.S. Application Data continuation of application No. 13/349,546, filed on Jan. 12, 2012, now Pat. No. 8,744,119.

(60) Provisional application No. 61/431,965, filed on Jan. 12, 2011.

(51) Int. Cl.
*H04W 12/02* (2009.01)
*G06F 21/32* (2013.01)

(56) References Cited

U.S. PATENT DOCUMENTS

| | | | | |
|---|---|---|---|---|
| 8,472,667 B2* | 6/2013 | Suzuki | ............... | G06K 9/00771 |
| | | | | 348/169 |
| 8,516,606 B2* | 8/2013 | Dorfman | ............... | G06F 21/36 |
| | | | | 382/177 |
| 8,624,900 B2* | 1/2014 | Jones | ............... | G09G 5/28 |
| | | | | 345/471 |
| 8,705,811 B1* | 4/2014 | Brunner | ............... | H04N 5/20 |
| | | | | 348/169 |
| 8,744,119 B2 | 6/2014 | Shuster | | |
| 8,893,034 B2* | 11/2014 | King | ............... | G06F 21/36 |
| | | | | 715/710 |
| 8,978,121 B2 | 3/2015 | Shuster | | |
| 9,135,493 B2 | 9/2015 | Shuster | | |
| 2004/0001220 A1* | 1/2004 | Gorday | ............... | H04N 1/38 |
| | | | | 358/1.15 |
| 2004/0073439 A1* | 4/2004 | Shuster | ............... | G07C 9/00079 |
| | | | | 705/5 |
| 2005/0229251 A1* | 10/2005 | Chellapilla | ............... | G06F 21/31 |
| | | | | 726/23 |
| 2005/0286799 A1* | 12/2005 | Huang | ............... | G06T 11/00 |
| | | | | 382/275 |
| 2007/0064979 A1* | 3/2007 | Chhibber | ............... | G06K 9/2018 |
| | | | | 382/118 |
| 2007/0122005 A1* | 5/2007 | Kage | ............... | G06K 9/00275 |
| | | | | 382/115 |
| 2007/0127788 A1* | 6/2007 | Kakinuma | ............... | G06K 9/00228 |
| | | | | 382/118 |
| 2007/0237421 A1* | 10/2007 | Luo | ............... | G06T 11/60 |
| | | | | 382/284 |
| 2007/0258656 A1* | 11/2007 | Aarabi | ............... | G06K 9/00228 |
| | | | | 382/254 |
| 2008/0066014 A1* | 3/2008 | Misra | ............... | G06F 21/36 |
| | | | | 715/846 |
| 2008/0085051 A1* | 4/2008 | Yoshii | ............... | G06K 9/3266 |
| | | | | 382/182 |
| 2008/0292144 A1* | 11/2008 | Kim | ............... | G06K 9/00604 |
| | | | | 382/117 |
| 2009/0041310 A1* | 2/2009 | Yang | ............... | G06K 9/00275 |
| | | | | 382/118 |
| 2009/0141947 A1* | 6/2009 | Kyyko | ............... | G06K 9/00208 |
| | | | | 382/118 |
| 2009/0262987 A1* | 10/2009 | Ioffe | ............... | G06K 9/00281 |
| | | | | 382/118 |
| 2010/0157129 A1* | 6/2010 | Lee | ............... | G06K 9/00228 |
| | | | | 348/333.04 |
| 2010/0172580 A1* | 7/2010 | Takenouchi | ............... | G06K 9/00624 |
| | | | | 382/165 |
| 2012/0070042 A1* | 3/2012 | Ioffe | ............... | G06K 9/00281 |
| | | | | 382/118 |
| 2012/0093355 A1* | 4/2012 | Levien | ............... | G06F 21/10 |
| | | | | 382/100 |

OTHER PUBLICATIONS

Newton et al ("Preserving Privacy by De-Identifying Face Images", IEEE Transactions on Knowledge and Data Engineering, vol. 17, No. 2, Feb. 2005).*

* cited by examiner

GRAPHIC DATA ALTERATION TO ENHANCE ONLINE PRIVACY

CROSS-REFERENCE TO RELATED APPLICATION

This application claims priority to and is a continuation of U.S. patent application Ser. No. 14/294,047 (U.S. Pat. No. 9,135,493, to be issued Sep. 15, 2015), which is a continuation of U.S. patent application Ser. No. 13/349,546, filed on Jan. 12, 2012 (now U.S. Pat. No. 8,744,119, issued Jun. 3, 2014), which claims priority to U.S. Provisional Patent Application Ser. No. 61/431,965, filed Jan. 12, 2011, which is hereby incorporated by reference in its entirety.

FIELD OF INVENTION

This application relates to methods and systems for image data processing and image sharing over a network.

DESCRIPTION OF THE BACKGROUND

Anonymity on the internet is being destroyed by technology that allows searching databases of images for people. There are services such as "tineye" that find duplicate photographs, and technology such as Google's Picasa are capable of going much further, identifying a person in a photograph and then finding them in other photographs. For example, a Congressman's swearing-in photo might be used to develop the set of facial characteristics that are then looked for in other pictures, leading to the location of otherwise obscurely located embarrassing bachelor party pictures. See also the United States patent on the subject, "Method and Apparatus for Photograph Finding", U.S. Pat. No. 7,454,498 and related continuations. It would be desirable for people who publish personal images on computer networks to conveniently ensure that posted images will not be subject to undesired image recognition applications, but solutions to provide such protection while still enabling online sharing of personal image data are either currently unavailable or suffer from substantial limitations in convenience or effectiveness.

SUMMARY OF THE INVENTION

Methods and systems for image processing to protect specified personal identities or geographic locations from automatic recognition, or graphic data alteration to enhance online privacy, are described in detailed in the detailed description, and certain aspects are described or summarized below. This summary and the following detailed description should be interpreted as complementary parts of an integrated disclosure, which parts may include redundant subject matter and/or supplemental subject matter. Omissions in either section do not indicate priority or relative importance of any element described in the integrated application. Differences between the sections may include supplemental disclosures of alternative embodiments or additional details, or alternative descriptions of identical embodiments using different terminology, depending on the nature of the differences.

In an aspect, a method for graphic data alteration to enhance online privacy may include a number of steps, all of which may be performed by a computer, either automatically or semi-automatically. The method may include altering at least one recognizable metric or text in a digitally-encoded photographic image by a computer operating an alteration algorithm in response to user input data while preserving an overall aesthetic quality of the image and obscuring an identity of at least one individual or geographic location appearing in the image. The method may further include storing, in a computer memory, an altered digitally-encoded photographic image prepared by the altering of the at least one recognizable metric or text in the digitally-encoded photographic image. Altering the image may include altering selected facial recognition metrics. In addition, or in the alternative, altering the image may include scrambling text.

As used herein, an "aesthetic quality" means a quality determined by the subjective taste of an individual human being, or collectively by an aggregate of subjective tastes of a group of individual human beings. An aesthetic quality may be measured using an input-output processing machine, such as a computer, collecting user input from user input devices that is correlated to machine outputs such as graphic displays of a set of images under consideration. A heuristic aesthetic quality measuring algorithm may be trained by human inputs to recognize values for a set of image parameters that an individual person, or a group of persons will subjectively perceive as preserving an overall aesthetic quality of an image. Such a heuristic aesthetic quality measuring algorithm, after an initial training period, may be used to provide input for automatic control of alterations to images so as to preserve an overall aesthetic quality of the images, with or without further user feedback, for an individual user or a group of users.

In another aspect, the method may include controlling at least one parameter of the alteration algorithm so as to obscure the identity from automatic recognition by an image recognition algorithm to below a defined minimum confidence level. In addition, the method may include modifying at least one parameter of the alteration algorithm in response to user input specifying the desired confidence level.

User feedback may be used to train a heuristic algorithm so as to produce altered images that preserve a desired aesthetic quality of an image while obscuring an identity, for example a personal identity that is recognizable using a facial recognition algorithm. Accordingly, a method may include publishing the altered image in an electronic medium, and receiving user feedback data, by a computer server via a communications network, regarding at least one of whether (a) the overall aesthetic quality of the image is preserved by the altered image or (b) the identity is obscured in the altered image. The method may further include modifying at least one parameter of the alteration algorithm in response to the user feedback data. The method may further include repeating the altering at least one recognizable metric or text in the digitally-encoded photographic image, based on a modified parameter of the alteration algorithm from the modifying at least one parameter of the alteration algorithm.

In another aspect, the method may include defining an alteration algorithm for the altering so as to obscure the identity from automatic recognition using a minimal value of $$\Delta = \sum_{1 to M} \overline{\partial i},$$

wherein $\delta i$ is a measure of metric alteration each of for a number M of different facial recognition metrics. The method may further include selecting the number M of metrics so as to lower each applied δi to below a human-perceptible threshold. For example, the number M may be increased, thereby causing an increased number of alterations on a image, while the amount of each alteration is decreased. To use a simple example, instead of changing an amount of separation between eyes on a face by at least 10% to prevent automatic facial recognition (i.e., M=1 and δi>±10%), the alteration may change an amount of separation between the eyes by a lesser amount, and may also change some other metric, for example the width of the mouth (e.g., M=2 and δi<±10%).

In an alternative aspect, the method may include identifying a recognition parameter set based on the recognition algorithm, wherein the recognition parameter set is defined by a set of parameter range values outside of which the recognition algorithm cannot recognize the identity above the defined minimum confidence level. In such case, the method may further include defining parameter values for the alteration algorithm used in the altering of the image within the recognition parameter set. In addition, the method may further include controlling at least one parameter of the alteration algorithm so as to preserve an overall aesthetic quality of the image as determined by an aesthetic quality measuring algorithm to above a defined minimum preservation level. The aesthetic quality measuring algorithm may be a heuristically trained algorithm that has previously been trained by user feedback over a sample set of images. The method may further include identifying an aesthetic preservation parameter set based on the aesthetic quality measuring algorithm, wherein the aesthetic preservation parameter set is defined by a set of parameter range values outside of which the aesthetic quality measuring algorithm determines that the aesthetic quality of the image has changed in an amount that exceeds the defined minimum preservation level. The method may further include determining a third set of parameter values by a set difference of the aesthetic preservation parameter set and the recognition parameter set, wherein the set difference is defined as parameter values that are members of the aesthetic preservation parameter set and are not members of the recognition parameter set.

In related aspects, an apparatus for graphic data alteration to enhance online privacy may include a processor coupled to a memory and a network interface, the memory holding instructions that when executed by the processor cause the apparatus to perform any of the methods and aspects of the methods summarized above or described elsewhere herein. Certain aspects of such apparatus (e.g., hardware aspects) may be exemplified by equipment such as a network interface for network communications. Similarly, an article of manufacture may be provided, including a non-transitory computer-readable storage medium holding encoded instructions, which when executed by a processor, may cause a specialty device configured as an image processing server or client node to perform ones of the methods and aspects of the methods described herein.

Further embodiments, aspects and details of the method and apparatus for graphic data alteration to enhance online privacy are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

DETAILED DESCRIPTION

Figure 1:
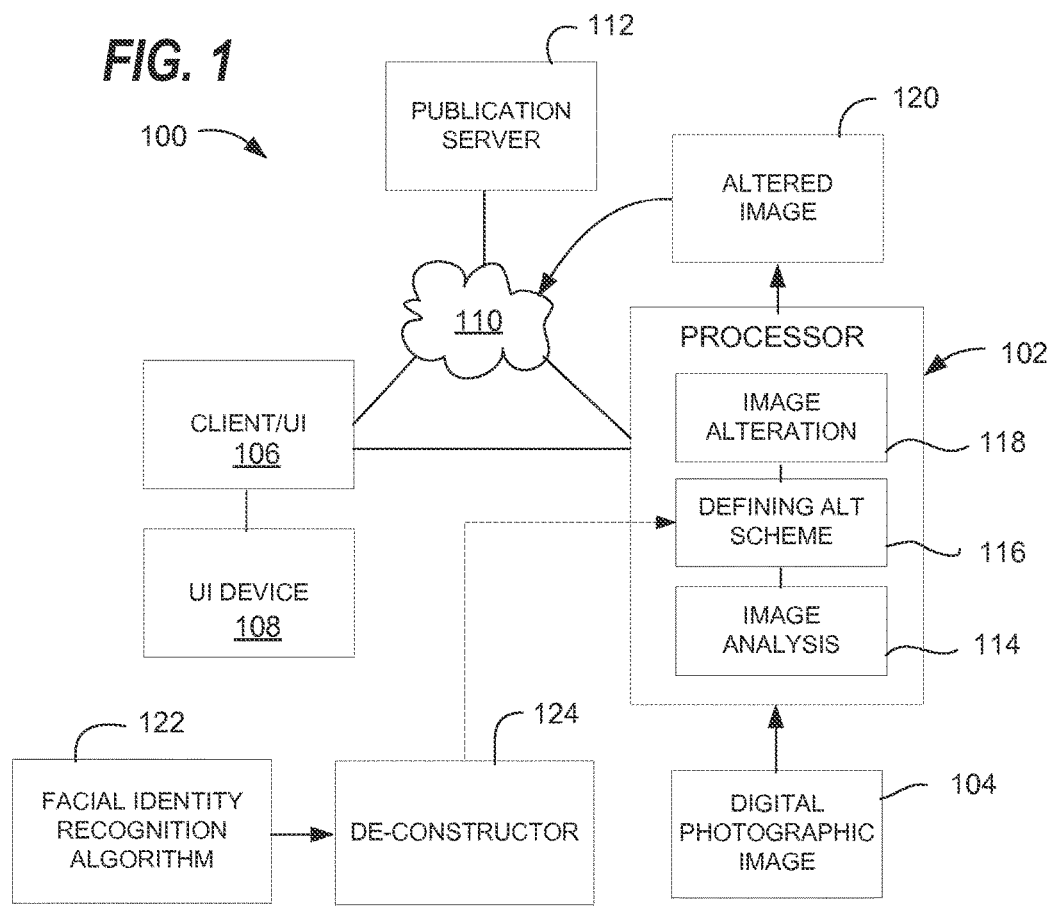
FIG. 1 is a block diagram showing an example of a system for graphic data alteration to enhance online privacy and related operations.

To improve anonymity, an apparatus may process image data to defeat the ability of automated programs to identify faces or other elements. Image data may be provided in a great variety of formats, for example, TIFF, GIF, JPEG, MPEG, and so forth, which may include both still images or video frames. The present technology is not limited to a particular image data format. The present technology may include a method wherein the same criteria utilized by a computer performing automatic analysis of images to identify faces (i.e. distance between pupils, distance from tip of nose to ears, similar metrics) to trick the identification software. The technology may include a image alteration method similar to those used in Photoshop's™ "Puppet Warp", "Liquify", or other manipulation techniques to introduce minor modifications to the facial or other photographic characteristics, for example body characteristics or even vehicle, house, or other object characteristics when attempting to keep such photographs "private". In such methods, the amount of alteration may be automatically controlled according to techniques as disclosed in more detail herein to achieve anonymity without sacrificing a desired overall aesthetic quality for an image. In an example, one might take a photograph of a 9 year old daughter, submit it to the program, elect a "moderately aggressive" obscuration level, and the program would slightly enlarge the distance between her eyes, reduce slightly her nose and ear size, slightly shorten her chin and plump her lips. The more aggressive the modifications, the more likely the changes would cause a noticeable (to humans) alteration in appearance, but the billions of photographs online provide such a large database to compare to that even changes small enough to be imperceptible to the human eye may often be sufficiently significant to a computer program to cause it to be unable to identify an altered image as being of the same person as an unaltered image. Alterations may need to be more aggressive as computing power and recognition algorithms improve, or if there is a need to defeat recognition within a smaller subset of photos, for example, within a geocoded group of photos taken within a limited geographic area. The aggressiveness of the alterations may be set manually, or automatically depending on the metadata or other indicia of uniqueness within the photograph.

To add to the anonymity, text accompanying photographs can optionally be scrambled and made non-searchable by scrambling the middle letters. Humans are capable of reading sentences where the letters in each word are all present, the first and last letter are in proper position, but the remaining letters are randomized. For example, "Hnumas are calabple of rdeanig seetnnces whree the leettrs in ecah wrod are all psenret". This may be done in conjunction with facial alteration, or independently of it.

In addition, identical alteration schemes may be applied for each of a group of photos. This way, for example, all public photos of Congressman Smith might be identically altered (i.e. eye distance increased by 4%, nose size reduced by 2%, etc), so that photos within a group would be associated by automated identification software. One searching for Congressman Smith photos would then be able to find all of the altered photos as identified with appropriate text or tags in the contextual web page, but would not be able to find the unaltered "frank smith" photos. This kind of grouping would reduce the chance that an unaltered photo would be seen as similar to an altered photo. That is, a set of randomly altered photos might fit into a resulting continuum of alterations done around a common feature set, namely the metrics of the original unaltered photo, thereby increasing the risk that that the photos could at least in theory be identifiable as belonging to the same group. By applying systematic alterations to a group of photos, a photo publisher may in essence generate a new "median" common feature set for the person at issue. As used herein, a "scheme" means an algorithm including a set of parameters that may be varied to control how the algorithm operates, and may sometimes be used interchangeably with "algorithm."

FIG. 1 shows a system 100 including a client or user interface component 106 connected to an image processor 102, directly or via a WAN cloud 110. The processor 102 may be, or may include, one or more computer processors, for example multi-core or single-core processors sold under various product names from suppliers such as Intel™, AMD™ and others. The user interface component may receive digital signals from a user interface device 108, for example a touchscreen, keyboard, camera or microphone, derived from physical user input. The image processor 102 may comprise various components or modules 114, 116 and 118, which may be coded in hardware, firmware, software, or some combination of the foregoing. Accordingly, the modules 114, 116 and 118 may be, or may include, a computer memory or non-transitory computer-readable medium holding instructions executable by the processor 102 to cause an image alteration apparatus to perform one or more operations of the methods disclosed herein. The modules 114, 116 and 118 coupled to the processor 102 may include means for image analysis, means for defining an alteration scheme, and means for image alteration. Each of said means may include the processor 102 operating an algorithm, according to more detailed aspects of algorithms and/or data processing or input/output operations as disclosed elsewhere herein. In addition, the processor 102 may receive information from a de-constructor module 124, which may be included in programming for the processor or linked to it via a link from an external device.

One or more digitally encoded photographic images 104 from any suitable source may provide input for system 100. An image 104 may be provided to the processor 102 by any suitable method, for example by uploading from a remote client or downloading from a remote storage or cloud storage resource. Generally, the image should be unpublished to a public forum at the time it is provided to the processor 102 for alteration, because a purpose of the alteration is to protect the privacy of persons or personally-identifiable objects appearing in the image 104. In an embodiment, a purpose is to prevent an automatic facial or personal recognition algorithm from recognizing the identity of specific persons or places appearing in the image 104.

To this end, the de-constructor (i.e., reverse engineering) component 124 may operate independently to determine one or more recognition boundaries of an applicable recognition algorithm 122. "Recognition boundaries" may be, or may include, a parameter set for applicable metrics that is defined by a set of parameter range values outside of which the recognition algorithm cannot recognize the identity above the defined minimum confidence level. The recognition algorithm 122 may generally be considered to be a "black box" under the control of an entity independent of any operator of processor 102. Thus, use of the de-constructor assumes that it is not possible to directly determine how the recognition algorithm 122 operates; for example, if source code for the algorithm 122 is available to the operator of the image processor 102, there may be no need to operate a de-construction component 124.

The deconstruction component 124 may determine recognition boundaries by submitting a collection of images to the algorithm, including images of the same person or place in which details have been altered by varying amounts, then using the algorithm to identify matches against an unaltered photograph of a person or place. Results of the search returned by the recognition algorithm 122 may be analyzed to determine how much alteration is needed to renter a person or face unrecognizable to the algorithm, optionally as a function of the amount of image data searched. Analysis results may be compiled to prepare data for use by a module 116 for defining an alteration scheme. De-construction may be performed automatically, semi-automatically, or manually.

The processor component 102 may include a component 114 for performing image analysis. The component 114 may automatically or semi-automatically identify objects appearing in the digital image. For example, the photograph 102 may be digitally analyzed to identify one or more faces appearing in the image, and then via the user interface 106 solicit and receive user input selecting one or more of the faces for alteration. Similarly, the application may identify recognizable text appearing in the image 104, and receive user input via the user interface 106 designating one or more text areas for alteration.

The processor component 102 may also comprise a component 116 for defining an alteration scheme for altering selected portions of an image 104. The alteration scheme may be defined in response to user input and using information available for the applicable recognition algorithm or data set size to provide a specified level of confidence that, after alteration, the object will not be recognized by the recognition algorithm operating on the assumed data set and an overall aesthetic quality of object will be preserved. Default present values may be provided upon program initialization, and users may be enabled to change default values via the user interface 106. For example, a default confidence level for non-recognition may be set at 98%, and a user may change this to any desired value, for example 99.99% or 90%. In general, lowering the confidence level will result in less alteration of the image and raising the confidence level will result in greater alteration of the image. Accordingly, by raising or lowering a specified confidence value via a user interface to the alteration scheme component 116, a user may directly control an amount of overall aesthetic quality to preserve. In addition, alteration schemes may be configured to alter image metrics that are likely to be effective in preventing automatic recognition algorithms from recognizing a person or place appearing in a photograph, without causing a human who knows the person or place to be confused—or even to notice the alteration at all. The alteration scheme may include randomly selected elements or parameters, for example parameters randomly selected from a defined range of possibilities.

The image processor 102 may further comprise an image alteration component 118 for altering the image in according with a selected alteration scheme. Digitally this may be accomplished by translating and/or stretching selected parts of the image to be altered using an automatic alteration algorithm, in amounts defined by the alteration scheme, to provide an altered image 120. The altered image 120 should not contain information that would enable restoration of the original image 104 by anyone not possessing the original. For example, the altered image should be scrubbed of any metadata indicating what alterations were made and should not include any tell-tale artifacts indicative of particular alterations. Such artifacts may be avoiding by using a well-designed alteration algorithm that introduces random or quasi-random variability in altered pixel values, so that altered pixel values are not rigidly determined by adjoining unaltered pixels appearing in the image 120. The altered image may be stored in a memory device or non-transitory computer-readable medium, and/or provided to a user-specified client 106 or server 112 via a WAN 110.

Figure 2:
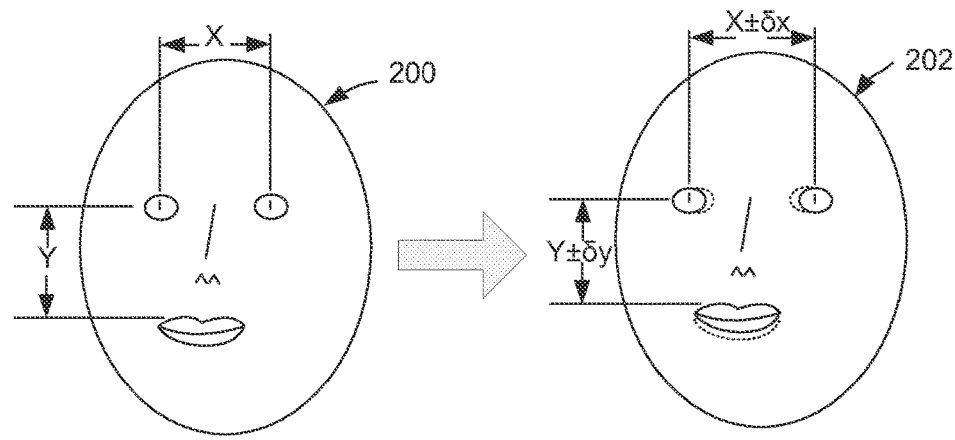
FIG. 2 is a diagram illustrating concepts related to facial recognition.

FIG. 2 provides a simple example of facial feature alteration using dual metrics 'X' and 'Y' appearing in an unaltered facial image 200 and, after alteration, in an altered facial image 202, for a metric number M. In should be appreciated that in an actual facial alteration, dozens or hundreds of metrics may be involved, for example, M may be in the range of about 10 to 1000. The example metric X defines a center-to-center distance between the eyes and the example metric Y defining a distance between the upper edge of the lips and the center of the eyes. In the altered facial image 202, pixels have been manipulated to change the distance between the eyes X by an amount 'δx' and the distance Y by an amount 'δy.' The altered face may be characterized by a sum of absolute values of 'i' metric changes or M number of metrics as follows:

$$\Delta = \sum_{1 to M} \overline{\partial i}.$$

Generally, it may be desirable to minimize the value of Δ by finding the lowest value that will effectively prevent automatic object recognition with the desired confidence level over the anticipated image data set, while applying alterations to a large enough M so that each alteration is very slight. That is, M may be maximized to the effective limit defined by the applicable recognition algorithm, which includes all metrics used for recognition, while Δ is minimized by altering each metric as little as possible. Of course, increasing M reduces computational efficiency, so the alteration scheme should not increase M beyond that needed to prevent automatic recognition while preserving the aesthetic qualities of the image to its intended audience. In addition, color or texture of skin tone and eyes may also be altered, or text may be scrambled as described above.

Aesthetic qualities, and a permissible amount of alteration that preserves overall aesthetic quality, are subjectively determined by an individual or group. These parameters can be systematically measured using a heuristic learning process based on user feedback, and may remain fairly stable over time for a given person or group. Thus, an image processing apparatus may determine a level of Δ, M and/or δi so as to preserve overall aesthetic quality of an image according to preferences of a person or group.

Figure 3:
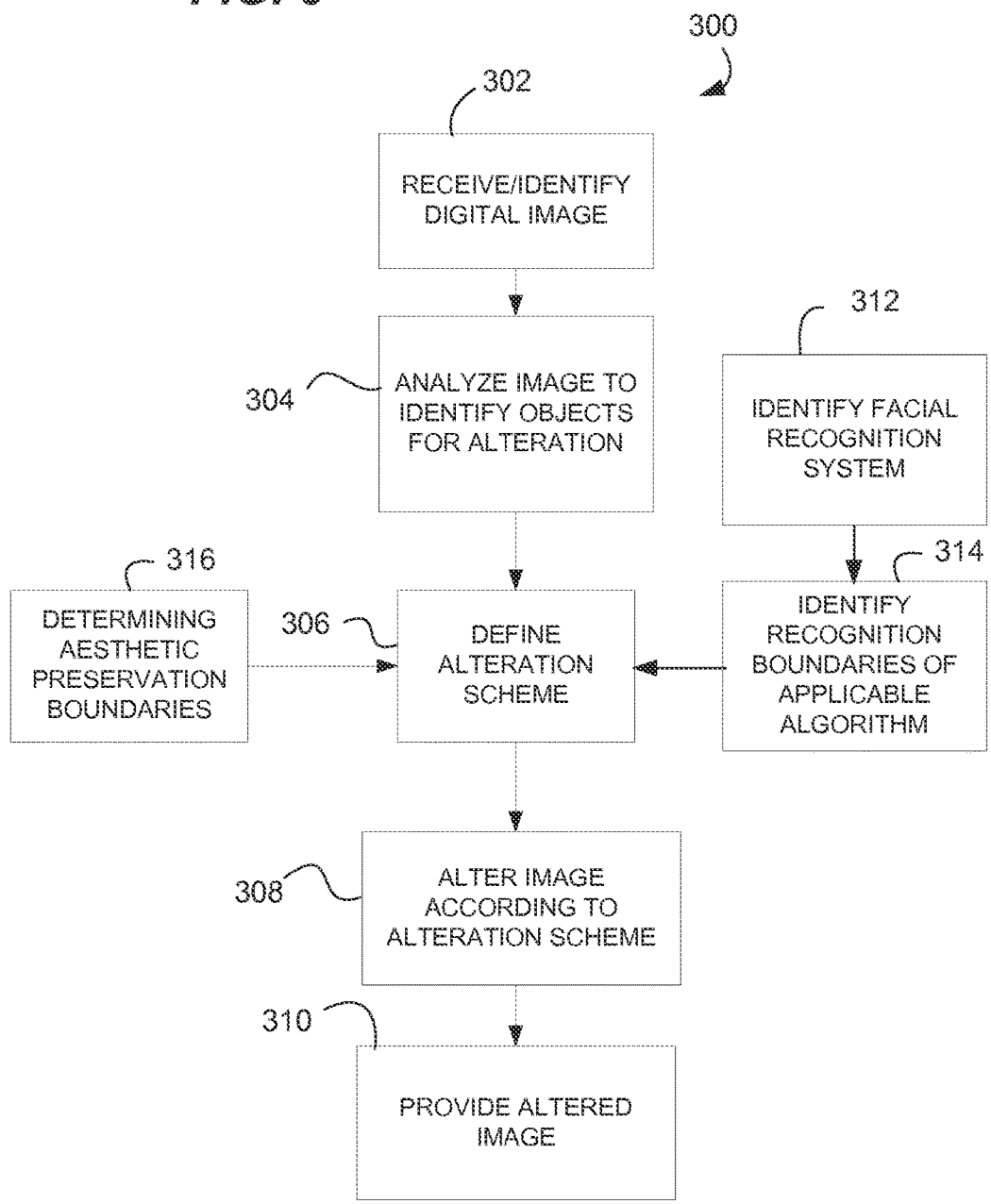
FIG. 3 is a flow chart showing an example of a method for graphic data alteration to enhance online privacy.

FIG. 3 is a flow chart showing an example of a method 300 for altering an image to prevent automatic recognition. At 302, the method may include receiving a digitally encoded image for alteration at a processor, or accessing the image identified by a user in a database. At 304, the processor may analyze the image to identify objects, such as faces, text, or locations, to be altered. Any suitable analysis method may be used. At 306, the processor may define an alteration scheme, to effectively prevent automatic recognition of the object to be altered without noticeably impairing the aesthetic of the image for its intended audience. For example, the processor may operate to apply a minimum effective Δ over a suitable large number M of metrics. In addition, or in the alternative, the processor may determine parameter sets for recognition boundaries and quality preserving boundaries, and base the alteration scheme on a set difference of the aesthetic quality preserving parameters and the recognition boundary parameter values.

Independently, the processor or a different processor may identify 312 one or more automatic facial recognition algorithms that are to be defeated, and using an iterative testing process, identify recognition boundaries 314 of the applicable algorithm. These boundaries may be parameterized and used for defining the alteration scheme 306. The operation summarized at block 314 may include identifying a recognition parameter set based on an object (e.g., facial) recognition algorithm, wherein the recognition parameter set is defined by a set of parameter range values outside of which the recognition algorithm cannot recognize the identity above a defined minimum confidence level. In such case, the method 300 may further include at 306 defining parameter values for the alteration algorithm used in the altering of the image within the recognition parameter set.

In addition, the method 300 may further include at 306 controlling at least one parameter of the alteration algorithm so as to preserve an overall aesthetic quality of the image as determined by an aesthetic quality measuring algorithm to above a defined minimum preservation level. The aesthetic quality measuring algorithm may be a heuristically trained algorithm that has previously been trained by user feedback over a sample set of images. The alteration scheme may adopt parameter values designed to cause the alteration to preserve a designated amount of overall aesthetic quality of an image while obscuring an identity of at least one object appearing in the image to a designated recognition process. The designated amount of quality preservation may be determined directly in response to user input, for example by receiving user input indicating a minimum confidence level that the alteration will effectively defeat an automatic recognition process. In the alternative, the designated amount of aesthetic quality preservation may be automatically determined using a predictive algorithm as described herein, optionally a heuristic algorithm, and optionally using set operations with a recognition parameter set to define parameter values for the image alteration.

In an aspect, the method 300 may further include, at 316, identifying an aesthetic preservation parameter set based on the aesthetic quality measuring algorithm, wherein the aesthetic preservation parameter set is defined by a set of parameter range values outside of which the aesthetic quality measuring algorithm determines that the aesthetic quality of the image has changed in an amount that exceeds the defined minimum preservation level. The method may further include, at 306, determining a third set of parameter values by a set difference of the aesthetic preservation parameter set and the recognition parameter set, wherein the set difference is defined as parameter values that are members of the aesthetic preservation parameter set and are not members of the recognition parameter set.

Figure 4:
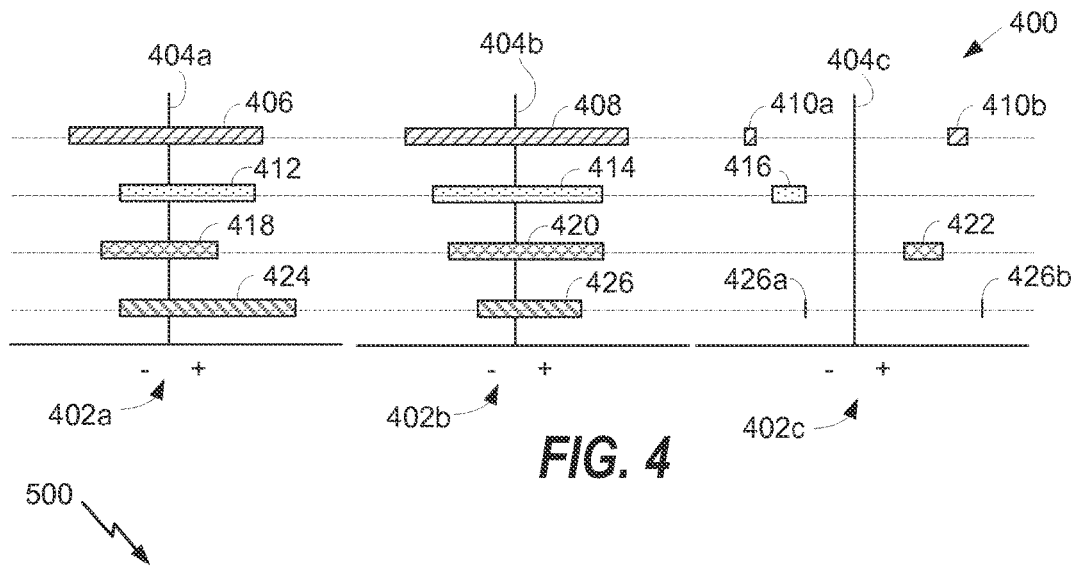
FIG. 4 is a diagram illustrating aspects of set operations for determining parameters of an image alteration algorithm for preserving an overall aesthetic quality of an image and obscuring an identity of at least one object appearing in the image.

An example of such set relationships is presented in FIG. 4, illustrating aspects of set operations 400 for determining parameters of an image alteration algorithm for preserving an overall aesthetic quality of an image and obscuring an identity of at least one object appearing in the image. It should be appreciated that the illustrated set operations are simplified for clarity of example, and that in the practice of the method, the set operations would involve determining many more parameter values and processing many more set operations than would be practicable except by a computer that is programmed according to the teaching herein. Accordingly, it should be apparent that such a computer should be used to perform the computational operations described herein for determining parameters of an image alteration algorithm that preserve an overall aesthetic quality of an image while obscuring an identity of at least one object (e.g., person or geographic location) appearing in the image.

A first parameter set 402a represents a recognition boundary for a particular recognition process, e.g., a facial recognition algorithm. The parameter set includes a set of parameter value ranges 406, 412, 418 and 424 arranged around a baseline 404a. These ranges represent pictorially an amount by which parameters of an image feature (e.g., an image of a person's face) can be altered without rendering the image feature unrecognizable by the applicable recognition process. Each range of parameter values 406, 412, 418 and 424 may include values greater than (+) or less than (−) the baseline 404a, which represent the measured actual value. The baseline value 404a is generally different for each parameter, and the center value and width of the range relative to the baseline may vary for each parameter. For example, parameter 406 may represent the distance between the top of the head and the lower jaw, with a baseline value of ten inches for a particular individual; parameter 412 may represent a distance between the eyes with a baseline vale of four inches for the individual, parameter 418 may represent the distance between the upper and lower eyelid, with a baseline value of 0.5 inch for the individual, and 424 may represent ratio of face width to length, with a baseline value of 0.8, as so forth. These examples are merely for illustration and are not intended to represent preferred or typical values.

A second parameter set 402b represents an aesthetic quality preservation boundary set corresponding to the same parameters illustrated for set 402a. The parameter values 408, 414, 420 and 426 represent a range of values respectively corresponding to the same measures 406, 412, 418 and 424. However, the parameter values in set 402b are generated as aesthetic preservation parameter set based on an aesthetic quality measuring algorithm, wherein the aesthetic preservation parameter set is defined by the set of parameter range values 408, 414, 420 and 426 outside of which the aesthetic quality measuring algorithm or user input determines that the aesthetic quality of the image has changed in an amount that exceeds a defined minimum preservation level.

A third parameter set 402c represents a set difference of set 402b and 402a. The set difference may be defined as parameter values 410a, 410b, 416 and 422 that are members of the aesthetic preservation parameter set 402b and are not members of the recognition parameter set 402a. In some cases a parameter value difference may result in a null result, for example where a preservation parameter value range 426 in set 402b lies entirely within its corresponding recognition parameter value range 424 in set 402a. In such cases, an alteration scheme definition process 306 may select one of the values 426a or 426b just outside the recognition parameter range 424, or may select the baseline value at 404a, or may select some value within the range 426. It is anticipated that using a much larger number of parameters should usually obviate the need to alter the image with respect to every parameter, and many parameters may be left unaltered or minimally altered to the extent not needed to obtain a desired confidence level of defeating a known maximally effective recognition algorithm. In selecting parameter values for image alteration, the definition process 306 may use a Monte Carlo method or similar statistical/iterative process to identify a set of alteration parameter values that are most likely to defeat known recognition algorithms in the anticipated publication space for the altered image, while resulting in a minimal change in the image aesthetic quality—thereby minimizing the perceived change in quality experienced by the intended target audience.

Referring again to FIG. 3, at 308, the processor may alter the image according to the defined alteration scheme to produce an altered image using an alteration algorithm, so that all metrics M selected for alteration are irrecoverably changed in the altered image. At 310, the processor may transmit or otherwise provide the altered image to a specified destination, including but not limited to storing the altered image in a computer memory. As noted image data may be stored in a great variety of data formats, e.g., JPEG, TIFF, GIF, etc., and any suitable format may be used.

Figure 5:
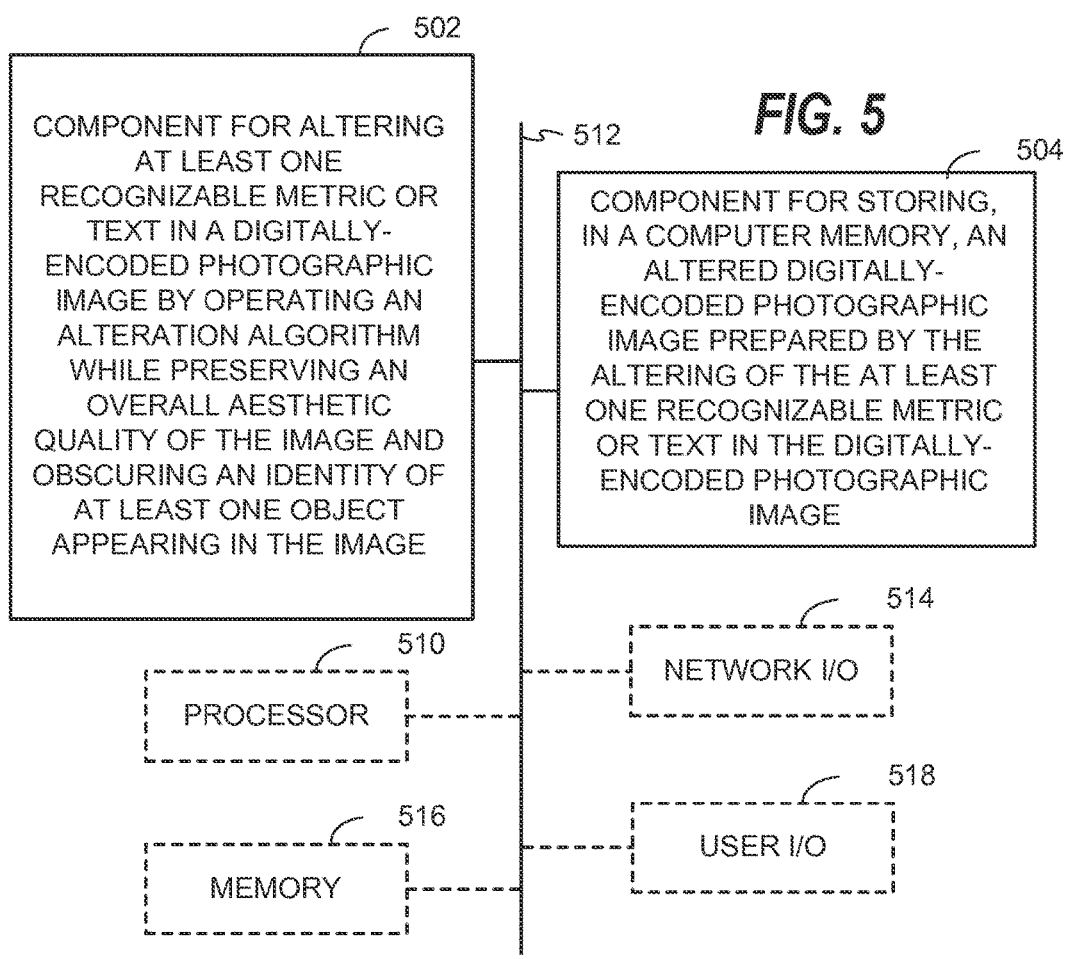
FIG. 5 is a block diagram illustrating aspects of an apparatus for performing a method as shown in FIG. 3.

With reference to FIG. 5, there is provided an exemplary image processing apparatus 500 that may be configured as a client or server computer, or as a processor or similar device for use within the computer. The apparatus 500 may include functional blocks that can represent functions implemented by a processor, software, or combination thereof (e.g., firmware). As illustrated, in one embodiment, the apparatus 500 may comprise an electrical component or module 502 for altering at least one recognizable metric or text in a digitally-encoded photographic image by an alteration algorithm while preserving an overall aesthetic quality of the image and obscuring an identity of at least one object appearing in the image. The component 502 may be, or may include, a control processor coupled to a receiver and to a memory, wherein the memory holds encoded instructions for the algorithm using parameters selected to preserve an overall aesthetic quality of the image while obscuring an identity of at least one object appearing in the image. The component 502 may be, or may include, a means for altering at least one recognizable metric or text in a digitally-encoded photographic image by an alteration algorithm while preserving an overall aesthetic quality of the image and obscuring an identity of at least one object appearing in the image. Said means may be, or may include, the at least one control processor operating an algorithm. The algorithm may include receiving image data in response to a user input, receiving further user input designating one or more parameter values for image alteration, retrieving parameters from a heuristic learning module designed to obscure the object while preserving overall aesthetic image qualities, and processing the image data to obtain altered image data based on selected values of the parameters. The algorithm may, in the alternative or in addition, include one or more of the detailed operations 312-316 discussed above.

The apparatus 500 may comprise an electrical component 504 for storing an altered digitally-encoded photographic image prepared by the altering of the at least one recognizable metric or text in the digitally-encoded photographic image in a computer memory. The component 504 may be, or may include, a control processor coupled to a memory, wherein the memory holds encoded instructions for causing the apparatus to store output from the image alteration algorithm in a designated computer memory. The component 504 may be, or may include, a means for storing an altered digitally-encoded photographic image prepared by the altering of the at least one recognizable metric or text in the digitally-encoded photographic image in a computer memory. Said means may be, or may include, the at least one control processor operating an algorithm. The algorithm may include receiving image data processed by the image alteration algorithm, configuring the altered data according to a selected file format, and storing a resulting image file in a selected computer memory.

In related aspects, the apparatus 500 may optionally include a processor component 510 having at least one processor. The processor 510 may be in operative communication with the components 502-504 via a bus 512 or similar communication coupling. The processor 510 may effect initiation and scheduling of the processes or functions performed by electrical components 502-504 and similar components.

In further related aspects, the apparatus 500 may include a network interface component 514 for sending and receiving data over a network, such as computer network or communications network. The apparatus 500 may further include user input/output components 518, for example, a touchscreen display, or non-touch sensitive display with a keyboard, microphone, pointing device, or other separate user input device. The apparatus 500 may optionally include a component for storing information, such as, for example, a memory device/component 516. The computer readable medium or the memory component 516 may be operatively coupled to the other components of the apparatus 500 via the bus 512 or the like. The memory component 516 may be adapted to store computer readable instructions and data for effecting the processes and behavior of the components 502-504, and subcomponents thereof, or the processor 510, or any of the operations of the methods disclosed herein. The memory component 516 may retain instructions for executing functions associated with the components 502-504. While shown as being external to the memory 516, it is to be understood that the components 502-504 can exist within the memory 516.

In view of the exemplary systems described supra, methodologies that may be implemented in accordance with the disclosed subject matter have been described with reference to one or more flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein, or methodologies may include additional operations that are described herein without being illustrated.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes computer storage media and temporary memory media. A storage medium or memory medium may be any available medium that can be accessed by a general purpose or special purpose computer via an electronic, optical, magnetic, or other media reader. By way of example, and not limitation, such computer-readable media may comprise RAM, ROM, EEPROM, CD-ROM, BluRay or other optical disk storage, magnetic disk storage or other magnetic storage devices, or any other medium that can be used to hold or store desired program code means in the form of instructions or data structures and that can be accessed by a general-purpose or special-purpose computer, or a general-purpose or special-purpose processor.

The following numbered examples illuminate certain aspects of the present technology. The scope of the present technology may extend beyond these examples in both details and generalities, as disclosed by the foregoing description.

The invention claimed is:

1. A system configured to impair automated image analysis, comprising:
  a processor coupled to a memory, the memory encoded with instructions that when executed by the processor, causes the system to:
    analyze a digitally-encoded image comprising one or more words and at least one face;
    alter selected facial recognition metrics in the at least one face using an alteration algorithm that identifies an alteration of the selected facial recognition metrics based on a value of $$\Delta = \sum_{1 to M} \partial i,$$

configured to substantially reduce risk of automatic recognition of the face while preserving an overall aesthetic quality of the image, wherein $\partial i$ is a measure of metric alteration of each of a number M of the selected facial recognition metrics;
    identify at least one word in the digitally-encoded image;
    alter the digitally-encoded image so that the position of at least two characters in the word are reversed, and the first and last letter of the word are in a proper position; and
    store in the memory, the altered digitally-encoded image.

2. The system of claim 1, wherein the processor further causes the system to modify at least one parameter of the alteration algorithm in response to user feedback data.

3. The system of claim 1, wherein
  a median common feature set, different than the actual feature set, is used as a starting point in generating variations across a group of images.

4. The system of claim 1, wherein the image altered is published in an electronic medium, user feedback is gathered with respect to the aesthetic quality of the image altered, and changes are made to the alteration algorithm based on the feedback.

5. The system of claim 1, wherein the processor further causes the system to introduce random or quasi-random variability in altered pixels configured such that altered pixel values are not rigidly determined by adjoining unaltered pixels appearing in the image.

6. The system of claim 1, wherein a median common facial feature set, different than an actual facial feature set of the at least one face, is used as a starting point in generating variations for the face across more than one image.

7. The system of claim 1, further comprising modifying at least one parameter of the alteration algorithm in response to user input specifying a minimum confidence level.

8. A computer system configured to impair automated image analysis, comprising:
one or more hardware processors programmed, via executable code instructions, to implement:
analyzing a digital image;
identifying at least one object in the image;
altering at least one characteristic of the object in the image using an alteration algorithm that identifies an alteration of the selected object recognition metrics based on a value of $$\Delta = \sum_{1 to M} \overline{\partial i},$$

configured to substantially reduce risk of automatic recognition of the object when compared to other objects of the same kind while preserving an overall aesthetic quality of the image, wherein $\delta i$ is a measure of metric alteration of each of a number M of the selected object recognition metrics.

9. The computer system of claim 8, wherein the digital image comprises a face.

10. The computer system of claim 9, wherein the at least one object is one of a vehicle or a building.

11. The computer system of claim 9, wherein the at least one object is an indicator of a geographic location.

12. The computer system of claim 9, wherein the at least one object is the face.

13. The computer system of claim 12, wherein a median common facial feature set, different than an actual facial feature set of the at least one face, is used as a starting point in generating variations for the face across more than one image.

14. The computer system of claim 9, where the object is a body.

15. The computer system of claim 9, wherein the alteration algorithm creates random or quasi-random variability in altered pixel values such that the altered pixel values are not rigidly determined by adjoining unaltered pixels appearing in the image.

16. The computer system of claim 9, where the image altered is published in an electronic medium, user feedback is gathered with respect to the aesthetic quality of the image altered, and changes are made to the alteration algorithm based on the feedback.

17. A computer system configured to impair automated face recognition analysis, comprising:
one or more hardware processors programmed, via executable code instructions, to implement:
analyzing at least two digital images, each containing the same person's face;
identifying the face in each image;
altering at least one characteristic of the face in at least one of the images so that automated face recognition techniques are rendered less effective in uniquely identifying the face; and
applying same alterations to the face in each of the other images.

18. The computer system of claim 17, wherein the images are not analyzed at the same time.

19. The computer system of claim 17, wherein a median common facial feature set, different than an actual facial feature set of the at least one face, is used as a starting point in generating variations for the face across a group of images.

20. The computer system of claim 17, wherein the images altered using the same alterations are grouped based on text or tags in a contextual web page.

* * * * *